May 19, 1970  J. H. CHARD  3,512,334
PATTERN PROJECTION FOR SKIN-PACKAGING
Filed Oct. 27, 1967  2 Sheets-Sheet 1
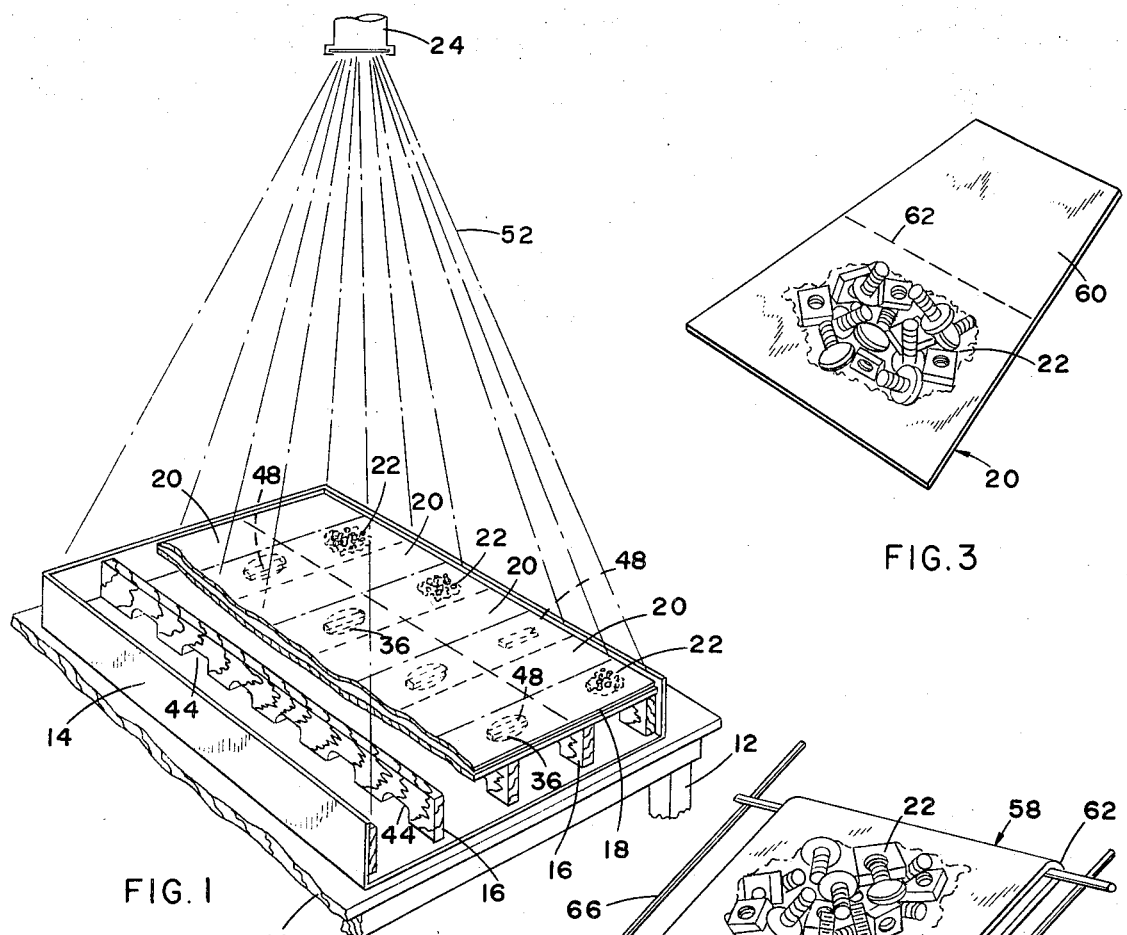
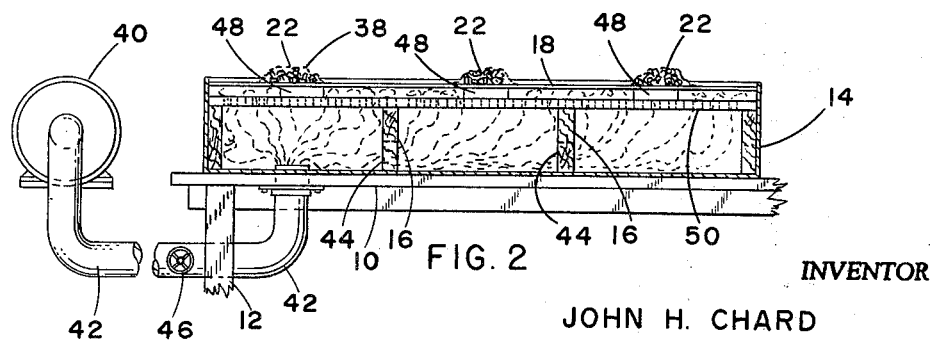
INVENTOR
JOHN H. CHARD
BY
ATTORNEY May 19, 1970  J. H. CHARD  3,512,334
PATTERN PROJECTION FOR SKIN-PACKAGING
Filed Oct. 27, 1967  2 Sheets-Sheet 2
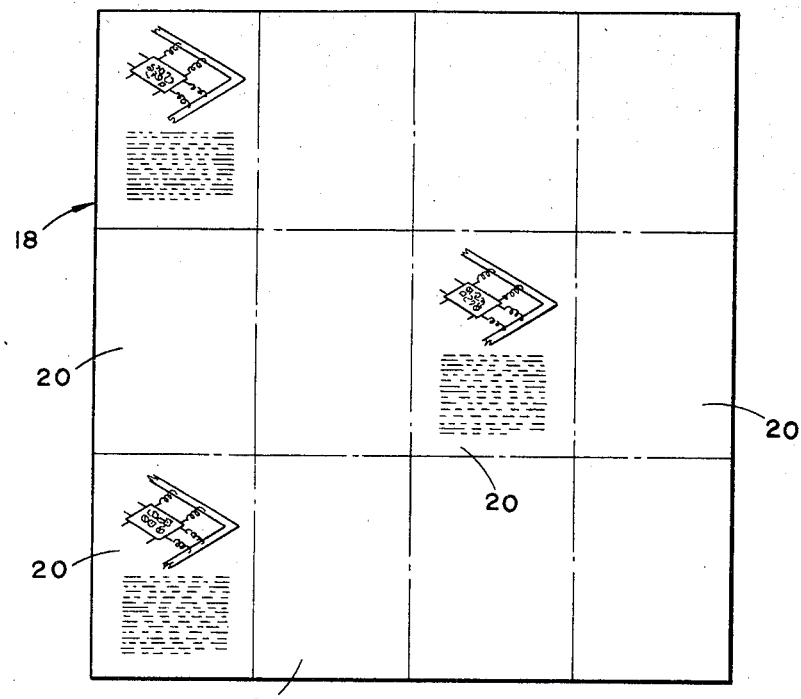
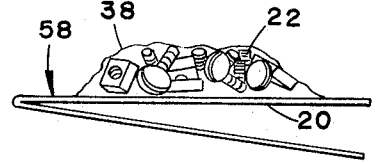
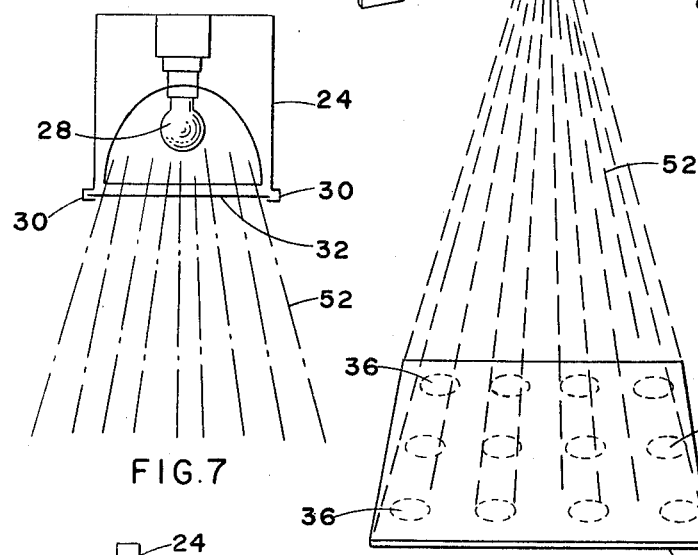
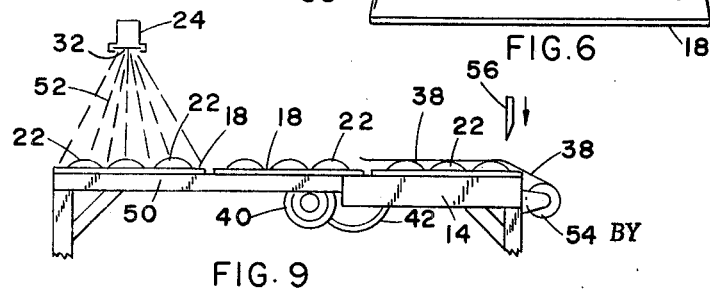
INVENTOR
JOHN H. CHARD
ATTORNEY

3,512,334
PATTERN PROJECTION FOR SKIN-PACKAGING
John H. Chard, Elizabethtown, Pa., assignor to Pack-Co, Inc., Elizabethtown, Pa.
Filed Oct. 27, 1967, Ser. No. 678,713
Int. Cl. B65b 31/00
U.S. Cl. 53—112                                4 Claims

ABSTRACT OF THE DISCLOSURE

A process and apparatus to package similar objects or groups of objects between a backing member and cover sheet by accurately locating said objects upon a backing sheet from which a plurality of said packages are to be formed by means of projecting an optically visible pattern upon said backing sheet to indicate said desired locations thereon, applying said cover sheet thereover and connecting it to said backing sheet, and severing said backing sheet and connected cover sheet into individual packages.

Background of the invention

It is quite common practice at present to merchandise many types of articles of both household and commercial use in packages comprising a base or backing sheet which is relatively stiff and generally is formed from cardboard, tagboard, or the like. After placing an object or a group of objects upon such a backing member, two principal types of cover members are currently in vogue. One of these is known as blister wrapping and comprises a sheet of transparent material, formed from certain types of synthetic resin, in which a convex bubble or blister-like portion is formed, either by suction or pressure molding, in the sheet resinous material of the type used. The bubble or blister is of adequate size to accommodate the object or group of objects which are to be retained by said cover member upon the backing member.

The other principal type of cover means used comprises what is used in skin-packaging, wherein a sheet of relatively thin, pliable and usually transparent synthetic resinous material, such as polyethylene, is placed over the object or group of objects when positioned upon the backing member and, by means of vacuum, the flexible cover sheet is drawn very tightly against the object or group of objects and backing member, the cover sheet incidentally becoming suitably affixed by appropriate adhesion to the backing member, thereby firmly connecteing said object or group of objects to the backing member.

To effect economies in packaging of this type, it is customary to utilize a sheet of backing material of substantial area comprising an appreciable number of individual backing members ultimately to be used in the above-described individual packages. Frequently, said sheet of backing material is printed either on one side or the other, or on both sides, to present the name and trademark, give instructions in use of the objects, or otherwise. Frequently, the individual backing members in the sheet of backing material have decorative effects printed thereon to enhance the appearance of the package and in many circumstances, it is necessary to dispose the objects or groups of objects to be packaged at specified locations upon each individual backing member in the overall sheet of backing material from which individual backing members are severed or otherwise separated when the packaging has been completed.

In accorance with current practice, the objects or groups of objects to be packaged in the manner described above are placed upon the overall sheet of backing material which comprises said plurality of individual backing members at predetermined locations thereon by means of templets. Such templets usually are sheet-like members of suitable thickness having a pattern of openings formed therein to coincide to the desired spacing of said individual backing members upon the sheet of backing material so that the required number of said objects are accommodated in each opening. When placed in said openings, said objects will be located at the desired predetermined positions upon the individual backing members of said overall sheet of backing material. The placing of said objects in the templet openings may be accomplished either manually or mechanically.

In establishments equipped to undertake the aforementioned type of packaging, it is obvious that various sizes of packages are required for use with different types of commodities. For example, the backing member for one commodity may be 4" x 6", while for another commodity it must be 3" square, and for still another commodity it might be 2" wide and 7" long, these exemplary dimensions being solely for purposes of illustration and not restriction. Depending upon the particular commodity to be packaged and the location thereof desired upon the backing member in the overall sheet of backing material, it is apparent that quite a substantial number of different templets are required to be used in any particular packaging establishment. Maintaining a supply of such templets is not only a substantial capital investment, but storage problems are involved as well as damage occurring to the templets from time to time which requires replacement of the same.

Summary of the invention

The principal object of the present invention is to provide a packaging method and at least one embodiment of mechanism to perform the same by which the need for templets of the type described is completely eliminated. Objects or groups of objects to be packaged either by the aforementioned blister cover means or skin-packaging, are placed upon the required sheet of backing material comprising a plurality of individual backing members of card-like stock or the like, at predetermined locations, through the employment of readily visible, optical means which project beams of light in such a manner as to dispose a pattern of contrasting spots and background so as to designate desired localities where the objects or groups of objects are to be placed upon the overall sheet of backing material. The sheet of backing material is held substantially horizontally for such purposes under most circumstances and a sheet of backing material upon which the objects or groups of objects have been placed at such predetermined locations then may have the cover sheet applied at that location or be moved to a covering station where the cover sheet is applied, the cover being either the blister or skin-type.

Under circumstances where the objects being packaged have a tendency to roll, particularly where the objects are subject to magnetic attraction, it is contemplated that magnets may be disposed at desired locations beneath the sheet of backing material to retain the objects at the desired, predetermined locations upon said sheet, at least until after the cover sheet has been applied to the backing sheet, and thereby enclose the objects between the backing sheet and cover sheet. Following the application of the cover sheet the individual packages are severed from the composite, aggregate group thereof formed by the overall sheet of backing material, thus completing the packaging operation in accordance with the principles of the invention.

Various details of the mechanism to perform the above-described method, such as means to support the sheet of backing material, mechanism to apply vacuum thereto incident to effecting skin-packaging, and other

Description of the drawings

FIG. 1 is a perspective view of an exemplary embodiment of mechanism to perform the packaging method comprising the present invention, part of the mechanism being broken away to illustrate details thereof.

FIG. 2 is a fragmentary transverse sectional view of part of the mechanism shown in FIG. 1 having attached thereto exemplary suction means to effect skin-packaging.

FIG. 3 is a perspective view of one example of skin-type package capable of being formed by the mechanism shown in FIGS. 1 and 2.

FIG. 4 is a fragmentary perspective view of an exemplary use of the package of objects shown in FIG. 3.

FIG. 5 is a plan view showing one surface of a sheet of backing material comprising a plurality of backing members arranged in checkerboard manner for application of objects to be placed thereon for packaging.

FIG. 6 is a perspective view of the mechanism shown in FIG. 1 arranged for vertical adjustment and illustrated in relation to an exemplary sheet of backing material similar to that shown in FIG. 5.

FIG. 7 is an enlarged, vertical sectional view of an exemplary light arrangement shown in relation to an exemplary pattern member removably and adjustably supported by the light housing.

FIG. 8 is a plan view of an exemplary pattern member of the type shown in FIG. 7 but illustrated on a slightly larger scale than in FIG. 7.

FIG. 9 is an exemplary side elevation of a mechanical system arranged for production line-type of packaging in accordance with the present invention and showing certain of the mechanisms illustrated in the preceding figures.

FIG. 10 is an exemplary side elevation of a skin-type package of a group of objects to illustrate one embodiment of package which may be formed by the present invention.

Description of the preferred embodiments

The embodiment of mechanism illustrated in FIG. 1 is particularly adapted for use in what is known in the trade as skin-packaging. Said mechanism comprises a horizontal base member 10 which may resemble a table top, if desired, and supported by suitable legs 12. A generally rectangular frame 14 is composed of a plurality of connected sides of suitable height. Extending between certain of the sides are a series of preferably parallel partitions 16.

According to the preferred principles of the invention, the upper edges of the sides of the frame 14 project slightly above the upper edges of the partitions 16 for purposes of receiving upon the upper edges of said partitions a sheet of backing material 18 comprising a plurality of individual backing members 20 which respectively receive objects or groups of objects 22 at predetermined locations upon the backing members 20. Preferably, the dimensions of the sides of the frame 14 are such as to relatively closely receive the edges of the sheet of backing material 18, for purposes to be described.

To facilitate the desired, predetermined location of the objects or groups of objects 22 upon the sheet of backing material 18, the present invention utilizes optical means comprising an appropriate housing 24, which may be supported by any appropriate fixture, such as a bracket 26, shown in FIG. 6 in exemplary manner. The bracket preferably is arranged to support the housing 24 for vertical adjustment of reasonable extent with respect to the sheet of backing material 18. A source of light such as an appropriate electric lamp bulb 28 is supported within the housing and is connected to a suitable source of current controlled by appropriate switch means, not shown.

The lower face of the housing 24 is open and is provided with appropriate supporting and guide grooves 30 which receive opposed edges of a pattern member 32. An exemplary plan view of a suitable pattern member 32 is shown in FIG. 8, in which it will be seen that, for example, the entire area of the pattern member comprises a contrasting pattern of arrangements of light. The background may be opaque except for a series of transparent spots 34. Such spots, for example, are of suitable size and shape such that, when light from the bulb 28 is projected therethrough, they will form a desired pattern of optically visible light spots 36 of desired shape upon the sheet of backing material 18, as illustrated in exemplary manner in FIG. 6. Such pattern of spots designates the desired locations where the objects or groups of objects 22 are to be positioned upon the sheet 18 for ultimate covering by one of several types of cover sheets 38. If desired, the background of pattern member 32 may be transparent and the spots opaque, or different colors may be used to form a contrasting pattern.

One example of cover sheet comprises a so-called blister arrangement, wherein a concavity is formed within a sheet of synthetic resin material, either by pressure or vacuum molding, for example, in accordance with commercially known techniques used at present. A plurality of such blisters are formed in an overall sheet of such resinous material at locations coinciding with the pattern of spots 36 projected upon the sheet 18, for example. Under certain circumstances, the arrangement of blisters of the type referred to in the cover sheet somewhat facilitates the location of objects or groups of objects 22 upon the sheet 18, particularly if the cover sheet is of somewhat stable and relatively stiff nature. In accordance with the principles of the present invention, however, such facilitating of positioning of the objects 22 upon the sheet 18 by such concavities is not necessary but may be used if desired.

Though not restricted thereto, the present invention particularly is adapted to the formation of packages by the technique known as skin-packaging, wherein the cover sheet 38 is formed of relatively thin and pliable synthetic resin material such as polyethylene or the equivalent. Referring to FIGS. 1 and 2, to effect skin-packaging of individual or groups of objects 22, a sheet of backing material 18 of appropriate size to fit between the sides of the frame 14 is placed upon the upper edges of partitions 16. To function properly, for skin-packaging, it is essential that the sheet of backing material 18 be of a porous nature as is illustrated in somewhat diagrammatic manner in FIG. 2 by means of short dotted lines. Exemplary individual objects 22, as shown in FIG. 2, are placed upon the sheet 18 in accordance with the projected spots of light 36 as shown in exemplary manner in FIGS. 1 and 6. A pliable cover sheet 38 then is placed across the positioned objects 22 and upper surface of sheet 18, as shown in FIG. 2, and vacuum is applied.

One exemplary form of producing vacuum evenly across the entire lower surface of sheet 18 comprises a suitable fan or pump 40, the inlet of which is connected by a conduit 42 to the interior of frame 18, the inlet end of conduit 42 extending through the base member 10 as shown in FIG. 2. Appropriate communication between the spaces formed by the partitions 16 is accomplished by a plurality of notches 44 in such partitions which are seen in FIGS. 1 and 2. If desired, the vacuum pump 40 may be operated substantially continuously and an exemplary valve 46, shown in FIG. 2, which may be manually or foot-operated, for example, can be disposed in the conduit 42 and an appropriate release valve, not shown, may be included between the pump 40 and valve 46, if found necessary.

By such an exemplary arrangement, vacuum may be applied to the interior of frame 14 sequentially, as the sheets 18 are placed upon the frame and are loaded with objects to be packaged, followed by application of the cover sheet 38, whereupon the vacuum is applied to draw the cover sheet into close engagement with the individual objects or groups of objects 22 and thereby effectively package the same by enclosing them between the individual backing members 20 and the cover sheet 38.

Securing the cover sheet 38 to the individual backing members 20 may be accomplished in any of a number of different ways such as by applying to the upper surface of backing sheet 18 a coating of heat-sensitive adhesive material or such cements may, for example, be contact cements sensitive to the material of the cover sheet 38 but not necessarily sensitive to the objects being packaged. Pressure-sensitive cement may also be applied, for example, to the upper surface of the sheet of backing material 18 which is compatible with the cover sheet 38, or otherwise. Also, if desired or necessary, the cement which is applied to the upper surface of the sheet 18 may, for example, also be of a pressure-sensitive nature to which the objects or groups of objects being packaged are capable of adhering, at least lightly, and thereby effectively position the same upon the individual backing members 20 to prevent movement thereof from the desired predetermined location upon the backing members prior to the application of the cover sheet 38 thereto.

Another expedient also is contemplated by the present invention for purposes of suitably maintaining the positioned objects or groups of objects upon the sheet of backing material 18 prior to application of the cover sheet 38 thereto, particularly where the objects have sufficient iron content to be susceptible to magnetic force. As illustrated in exemplary manner in FIGS. 1 and 2, permanent magnets 48 may be supported within the frame 14 by any suitable means such as by a framework of horizontal bars 50, shown in exemplary manner in FIG. 2, or upon a sheet of perforated pegboard or the like, the strength of the magnets being adequate to at least temporarily secure the objects in desired position upon the sheet 18 until the cover sheet 38 is applied thereto and attached to sheet 18 so as to completely and effectively enclose the objects between the sheets 18 and 38.

An exemplary production-like type of mechanism for effecting skin-packaging in accordance with the principles of the present invention is illustrated in somewhat diagrammatic manner in FIG. 9. An elongated frame 50, having appropriate side guides thereon, for example, to guide longitudinal movement of the sheets of backing material 18 therealong, is of sufficient length to support a plurality of such sheets 18. At the left-hand end, for example, a sheet 18 may be positioned and subjected to the optical pattern member 32 so as to indicate the locations upon the sheet 18 where the objects or groups of objects 22 are to be positioned. After one of the sheets 18 has been loaded with the objects 22, it then is moved to the right as viewed in FIG. 9 until, ultimately, the loaded sheet 18 is brought over frame 14 to which vacuum is applied by means of the vacuum pump 40 for application of the cover sheet 38.

The covering material may be in the form of a roll 54, mounted adjacent the right-hand end of the frame 50, whereupon an operator may pull the leading end of the roll of sheet covering material 38 to the left, as viewed in FIG. 9, so as to extend the same over the loaded sheet 18. Then vacuum is applied to complete the packaging of the objects at least as far as forming a composite group of unsevered, individual packages is concerned. The leading cover sheet 38, which has been pulled from the roll 54 to extend over the loaded sheet 18, may be severed from the roll by any appropriate means such as an exemplary knife 56, whereupon the completed composite package comprising sheet 18, the objects 22, and cover sheet 38 applied thereto is removed from the frame 50 for subsequent severing of the individual backing members 20 and applied cover sheets 18 from each other, thereby forming individual packages 58, one exemplary illustration of which is shown in FIG. 10.

The present invention is highly adaptable to packaging objects and groups of objects positioned upon individual backing members 20 upon which appropriate printed decorations, instructions, or both, are provided. For example, if the surface of the individual backing members 20 upon which the objects or groups of objects are positioned is decorated, with the possible exception of a name or title, it may be that instructions for the use of the objects is preferred to be arranged on the reverse surface of each individual backing member 20. Such an arrangement is somewhat diagrammatically illustrated in exemplary manner in FIG. 5, wherein the illustration is intended to represent the reverse surface of a sheet of backing material 18 from that upon which the objects are positioned for packaging.

By selecting a suitable pattern of transparent spots 34, for example, upon the pattern member 32, to coincide with the printed arrangement of the instructions on the entire group of individual backing members 20 comprising the entire sheet 18 thereof and accurately locating the backing sheet 18 relative to the projecting optical pattern, it will be seen that the objects may very readily be mounted properly upon the reverse surface of the individual backing members 20 while the opposite surface upon which the instructions are printed is not viewable by the operator. However, when the packaging has been completed and the individual backing members 20 are severed from each other, the above-described arrangement is such that each one will have the desired printed instructions accurately located on the surface reverse to that upon which the object or objects 22 are enclosed by the cover sheet 38.

As indicated also in FIGS. 3 and 4, under certain circumstances, particularly to facilitate the mounting of a package of objects 22 upon structures or otherwise with which the objects are to be used, it may be desirable to form the individual backing members 20 with an extension 60 such as shown in exemplary manner in FIG. 3. Such extension may be folded along the line 62, for example, and brought into contact with the reverse surface of member 20 from that upon which the objects 22 are disposed. By such an arrangement, as shown in exemplary manner in FIG. 4, the overlapping free ends of the member 20 and extension 60 may be secured by staples 64, or otherwise, to an exemplary, somewhat fragmentarily illustrated device 66 with which the objects 22 are to be employed.

Many other modifications are possible over those specifically illustrated in the drawings for purposes of adapting the packaging and method and mechanism to certain types of objects to be packaged thereby, as well as means for attaching the packages to various devices, as well as rendering the packages capable of being displayed for sale, such as by providing perforated holes in the packages to receive supporting arms, brackets and the like of sales displays.

While the detailed description set forth above has been described relative to skin-packaging, many of the principles and structures described hereinabove and illustrated in the drawings are equally applicable to so-called blister packaging. In utilizing the invention with respect to blister packaging, however, it is possible that the suction means illustrated in connection with skin-packaging need not be employed except possibly to facilitate securing the cover sheet to the individual backing members so as to comprise a package enclosing the desired objects.

It should be obvious from the foregoing that the present invention provides a much less expensive and less bulky and cumbersome means for arranging objects or groups of objects upon a sheet of backing material for packaging than by the currently used procedure of employing templets to effect such positioning. Obviously, the expense of preparing, storing, and using the light-transmitting pattern members is far less than the equivalent cost of templets. The saving in time of changing one pattern for another is apparent and the use of such patterns completely eliminates the present need to handle templets incident to packaging operations as is now necessary to arrange objects to be packaged upon each backing sheet.

While the invention has been illustrated and described in its several preferred embodiments, it is to be understood that the invention is not to be limited to the precise details herein illustrated and described since the same may be carried out in other ways falling within the scope of the invention as claimed.

I claim:

1. Mechanism to package a plurality of uniformly spaced items of merchandise upon a sheet of backing material and enclosed thereon by cover means applied over said objects and attached to said backing material comprising in combination, means to support a sheet of backing material sufficiently large to support a plurality of said objects in a regularly spaced pattern of locations upon said sheet when supported substantially horizontally, optical means supported above said support means and comprising a concentrated single source of light and a light-transmitting member parallel to said sheet and below said source of light and having a pattern thereon corresponding to the spacing of said objects but reduced substantially in size and operable to project a visible shadow of said pattern of locations upon said sheet of backing material to designate where said objects are to be placed upon said sheet for packaging, and means to apply cover means over said objects upon said sheet of backing material and affix said cover means to said sheet circumferentially around the objects on each location upon said sheet of backing material.

2. Packaging mechanism according to claim 1 in which said optical means comprise supporting means for said light-transmitting pattern member and adapted to exchangeably support selectively members each having a different pattern arrangement of light-transmitting areas and contrasting areas of color or opacity thereon.

3. Packaging mechanism according to claim 2 further including means to support said pattern supporting means for vertical adjustment relative to said backing sheet and thereby vary the size of the optical pattern projected thereon by said optical means to accommodate the same to the spacing required by the objects to be packaged upon said backing sheet.

4. Packaging mechanism according to claim 1 further including frame means operable to support magnetic means thereon in a pattern coincident with that projected by said optical means, said magnetic means being positioned to directly support a sheet of said backing material and thereby maintain objects or groups of objects upon said sheet of backing material coincident with an optically visible pattern projected thereon.

References Cited

UNITED STATES PATENTS

| 3,323,415 | 6/1967 | Tobias | 353—62 |
| 3,377,770 | 4/1968 | Rorer | 53—112 |

FOREIGN PATENTS

| 908,269 | 10/1962 | Great Britain. |

TRAVIS S. McGEHEE, Primary Examiner